(12) United States Patent
Haider et al.

(10) Patent No.: US 7,538,162 B2
(45) Date of Patent: May 26, 2009

(54) PROCESS FOR THE PRODUCTION OF POLYOXYALKYLENE CONTAINING POLYOLS FROM PHENOL CONDENSATION PRODUCTS

(75) Inventors: Karl W. Haider, Wexford, PA (US); Stanley L. Hager, Cross Lanes, WV (US); Jack R. Reese, II, Hurricane, WV (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 418 days.

(21) Appl. No.: 11/473,686

(22) Filed: Jun. 23, 2006

(65) Prior Publication Data

US 2007/0299234 A1 Dec. 27, 2007

(51) Int. Cl.
*C08L 71/10* (2006.01)
(52) U.S. Cl. ........................................ 525/409; 525/405
(58) Field of Classification Search ........................ None
See application file for complete search history.

(56) References Cited

U.S. PATENT DOCUMENTS

| | | | | |
|---|---|---|---|---|
| 3,876,615 A * | 4/1975 | Vargiu et al. | ................... | 528/95 |
| 3,941,849 A | 3/1976 | Herold | ................... | 260/607 A |
| 4,046,721 A | 9/1977 | Austin et al. | .......... | 260/2.5 AW |
| 4,846,996 A | 7/1989 | Carroll et al. | .......... | 252/182.16 |
| 5,889,137 A | 3/1999 | Hutchings et al. | ........... | 528/205 |
| 6,127,491 A | 10/2000 | Dehm et al. | ................. | 525/461 |
| 6,136,879 A | 10/2000 | Nishida et al. | .............. | 521/174 |
| 6,204,300 B1 | 3/2001 | Kageoka et al. | ............. | 521/174 |
| 6,569,953 B1 | 5/2003 | Dehm et al. | ................. | 525/392 |
| 6,624,333 B1 | 9/2003 | Koser et al. | .................. | 568/609 |
| 6,884,826 B2 * | 4/2005 | Le-Khac et al. | ............. | 521/174 |
| 2004/0229970 A1 | 11/2004 | Sasaki et al. | ................. | 521/155 |

FOREIGN PATENT DOCUMENTS

| | | |
|---|---|---|
| EP | 0 425 694 A1 | 5/1991 |
| EP | 0 454 446 A1 | 10/1991 |
| WO | 98/27044 | 6/1998 |
| WO | 98/37116 A1 | 8/1998 |
| WO | 00/15689 A1 | 3/2000 |

* cited by examiner

*Primary Examiner*—Robert Sellers
(74) *Attorney, Agent, or Firm*—Noland J. Cheung; N. Denise Brown

(57) ABSTRACT

This invention relates to a one-stage process for the production of polyoxyalkylene containing polyols having equivalent weights of about 150 to about 6000 and functionalities of about 2 to 8. The process comprises (1) mixing (a) an organic compound having a hydroxyl functionality of about 2 to about 8 and an equivalent weight of about 35 to about 575, with (b) a hydroxyl functional compound having an equivalent weight of about 100 to about 6000 and a functionality of about 2 to 8; and (2) alkoxylating the mixture with (c) one or more alkylene oxides, in the presence of (d) one or more double metal cyanide catalysts. Suitable compounds to be used as (a) the organic compound having a hydroxyl functionality of about 2 to about 8 and an equivalent weight of about 35 to about 575 in the present invention include bisphenol-A, Bisphenol TMC, tetrabromobisphenol A, and novolak phenolic resins.

12 Claims, No Drawings

PROCESS FOR THE PRODUCTION OF POLYOXYALKYLENE CONTAINING POLYOLS FROM PHENOL CONDENSATION PRODUCTS

BACKGROUND OF THE INVENTION

This invention relates to a novel one-stage process for the production of polyoxyalkylene containing polyols which have equivalent weights of about 150 to about 6000 and functionalities of about 2 to 8.

Polyoxyalkylene containing monols and polyols are typically prepared by the reaction of a suitable starter (or initiator) compound with one or more alkylene oxides in the presence of one or more catalysts. In general, suitable starters or initiators include compounds having at least one hydroxyl group per molecule (i.e. alcohols) and preferably having two or more hydroxyl groups per molecule (i.e. diols, triols, and other higher polyols). Polyoxyalkylene containing polyols of this type are well known in the field of polyurethane chemistry.

Various references including, for example, U.S. Pat. Nos. 6,136,879 and 6,204,300 and EP 1457508 A1 describe the production of polyurethane foams from different polyol components. The foams of these references are low resilience flexible polyurethane foams. Both U.S. Pat. No. 6,136,879 and EP 1457508 disclose that suitable starters for the polyol components therein include compounds such as bisphenol A. However, neither reference actually prepares or uses such a polyol.

In addition, U.S. Pat. No. 6,136,879 discloses the preparation of polyurethane foams having a low rebound resilience and a low temperature dependence on the compression force deflection. These foams comprise the reaction product of a polyisocyanate with a polyol component and water, in the presence of a small quantity of an alkyl phenol. These alkyl phenols may be alkoxylated with ethylene oxide and/or propylene oxide.

Phenols are aromatic organic compounds that have one or more hydroxyl groups attached directly to the benzene ring. Although phenols contain hydroxyl groups like alcohols, their properties are clearly different than alcohols in which the hydroxyl groups are attached directly to an aliphatic or cycloaliphatic carbon atom. It is known in the art to alkoxylate diphenols and phenolic resins to prepare polyether polyols, however the preparation of these phenolic based polyols is more problematic than the preparation of polyols from starters bearing aliphatic hydroxyl groups. As described in U.S. Pat. No. 6,541,673, the decreased basicity of the alkali metal phenoxides (compared to alkali metal alkoxides) lowers the oxyalkylation rate considerably, and the reaction generally proceeds with a long induction time prior to attaining a reasonable oxyalkylation rate. It is also known that the alkylene oxides are poorly soluble in phenolic compounds, and thus a solvent (preferably toluene or xylene) is required for the oxyalkylation of phenolic starters. The addition of solvent, however, slows the oxyalkylation rate and also requires an additional processing step to remove it from the product. Another problem in preparing phenolic initiated polyols is that an increase in the reaction temperature to increase the oxyalkylation rate broadens the molecular weight distribution and increases the color of the product.

U.S. Pat. No. 4,846,996 describes liquid non-crystallizing two mole diphenol alkoxylate mixtures. These are prepared by the reaction of a mixture of two different alkylene oxides with a diphenol in the presence of an alkaline catalyst. These diphenol mixtures correspond to a specific formula, and are liquids at room temperature and may not crystallize even when stored for long time periods at sub-ambient temperatures. Mixtures of the diphenols of the specified formula comprise three components in relative amounts as specified. Outside of these ranges of the three components, the mixtures are solids and tend to crystallize.

Phenolic polymers prepared by aralkylation reactions are disclosed in U.S. Pat. No. 5,889,137. These phenol aralkylation polymers are derived from a phenolic monomer, at least one styrene derivative and an aryl diolefin. More specifically, these are prepared by aralkylating a phenolic monomer with at least one styrene derivative to form an aralkylated phenol, then reacting the aralkylated phenol with an aryl diolefin to produce the phenol aralkylation polymer, in which the aralkylated phenol is coupled via the aryl diolefin. When the primary linkage is in the ortho position, the resultant polymer has a lower melting point, and when the primary linkage is in the para position, the resultant polymer has a higher melting point.

Phenolic resin polyols based on aralkylated phenolics are described in U.S. Pat. Nos. 6,127,491 and 6,569,953. These polyols are the reaction product of an aralkylated phenol or phenol aralkylation polymer with an oxyalkylating agent which may be an alkylene oxide or an alkylene carbonate. The aralkylated phenols useful are those derived from a phenolic monomer, at least one styrene derivative and a coupling agent such as, for example, an aryl diolefin.

In U.S. Pat. No. 6,541,673, a process to overcome many of the aforementioned problems with oxyalkylating phenolic compounds to produce polyether polyols is described. It discloses that significant improvements are made in the preparation of aryl polyols by a staged temperature process in which a first oxyalkylation is conducted at a relatively high temperature, and further oxyalkylation is conducted at a lower temperature. This yields products in which the viscosity and polydispersity remain substantially the same, and in some cases lower compared with the lower temperature or solvent based processes. Also, the lower temperature and/or solvent based processes suffer from longer induction periods and overall reaction times, compared to the process of U.S. Pat. No. 6,541,673. Suitable aryl polyols include those produced by oxyalkylating a phenolic starter molecule containing at least two phenolic hydroxyl groups, and up to 10 or more hydroxyl groups. The starters for the polyols of this invention may be single or condensed rings. Preferred starters have non-condensed aryl groups linked to phenolic hydroxyl-containing rings through alkylene linking groups. This process requires the oxyalkylation be performed at two different temperatures, with the first being significantly higher than 135° C., (normal oxyalkylation temperature 100-125° C.), and preferably higher than 140° C. This high temperature oxyalkylation occurs first, and preferably at least 20% of the total oxyalkylation occurs at the high temperature. Then, the low temperature oxyalkylation follows, and preferably at least 20% of the total oxyalkylation is carried out at the low temperature. Although a process using the heel of a prior batch is discussed in Example 6 and Comparative Example 7, these are two-stage processes. U.S. Pat. No. 6,541,673 discloses that the viscosity of the resultant product increases when the two stage oxyalkylation process is not used.

Finally, U.S. Pat. No. 6,624,333 discloses a method for producing bisphenol alkoxylates. This process comprises reacting at least one bisphenol with alkylene oxide in the presence of a phosphine catalyst, which is essentially free of alkali metal hydroxide. Bisphenol A (i.e. BPA) is disclosed as a suitable bisphenol compound for this process. In a preferred embodiment, the bisphenol dialkoxylates are converted into the higher alkoxylated bisphenol alkoxylates in a subsequent reaction with an alkylene oxide.

Several commercially important bisphenol derivatives that would be useful as starters for polyether polyols are very high melting solids that would require either solvent or reaction temperatures in excess of the m.p. of the starter (i.e. >160° C.) to alkoxylate. These include bisphenol A, i.e. 2,2-bis(4-hydroxyphenyl)propane, (m.p. 158-160° C.); 1,1-bis(4-hydroxyphenyl)-3,3,5-trimethylcyclohexane, i.e. bisphenol TMC, (m.p. 204-206° C.); and 4,4'-(1-methylethylidene)bis[2,6-dibromophenol] (Tetrabromobisphenol A) (m.p. 179-182° C.). Surprisingly, it has been found that polyether polyols based on these and other phenolic or polyphenolic starters can be prepared in a single stage heel process at temperatures significantly below the melting point of the starter, in the absence of solvent. Since the process relies upon dispersing or dissolving the starter in a carrier (the heel) of a liquid hydroxyl or polyhydroxyl containing component, difficulties with melting and stirring solid starters are avoided. The processing temperatures are below those required by the two-stage process of U.S. Pat. No. 6,541,673. Also, since the process does not require a first alkoxylation at a higher temperature followed by a decrease in the temperature during the run, it is less energy intensive.

SUMMARY OF THE INVENTION

Throughout this application, the terms equivalent weight and functionality are to be understood to mean hydroxyl functionality and hydroxyl equivalent weight, unless otherwise specified. This invention relates to a one-stage process for the production of polyoxyalkylene containing polyols having an equivalent weight of about 150 to about 6000 and a functionality of about 2 to about 8.

The one-stage process for the production of polyoxyalkylene containing polyols comprises:

(1) mixing
   (a) from about 1% to about 70% by weight of an organic compound having a hydroxyl functionality of 2 to 8, an equivalent weight of about 35 to about 575, and which comprises the condensation product of:
      (i) a substituted or unsubstituted mono- or poly-phenol which corresponds to the structure:

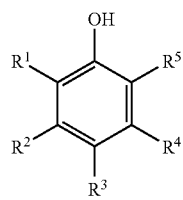

(I)

wherein:
$R^1$, $R^2$, $R^3$.
$R^4$ and $R^5$: each independently represent a hydrogen atom, a hydroxyl group, a halogen atom, an alkyl radical having from 1 to 20 carbon atoms and which may be substituted or unsubstituted, a cycloaliphatic radical having from 3 to 7 carbon atoms and which may be substituted or unsubstituted, an aryl radical having 6 carbon atoms and which may be substituted or unsubstituted, an aralkyl radical having from 7 to 20 carbon atoms and which may be substituted or unsubstituted, or any two adjacent R groups may have a combined total of 2 to 4 carbon atoms and form a fused ring with the base structure and may optionally be substituted; with the proviso that at least one of $R^1$, $R^3$ or $R^5$ always represents a hydrogen atom;
with
   (ii) a compound which corresponds to the structure:

(II)

wherein:
$R^6$ and $R^7$: each independently represents a hydrogen atom, an alkyl radical having from 1 to 20 carbon atoms and which may be substituted or unsubstituted, a cycloaliphatic radical having from 3 to 7 carbon atoms and which may be substituted or unsubstituted, an aryl radical having 6 carbon atoms and which may be substituted or unsubstituted, an aralkyl radical having from 7 to 20 carbon atoms and which may be substituted or unsubstituted, or $R^6$ and $R^7$ combine to form a ring having from 5 to 7 carbon atoms in the ring, with the ring being substituted or unsubstituted;

and
   (b) from about 30% to about 99% by weight of a hydroxyl functional component having an equivalent weight of about 100 to 6000, and a hydroxyl functionality of about 2 to about 8;
wherein the sum of the %'s by weight of (a) and (b) totals 100% by weight of the mixture (1);

and (2) alkoxylating the mixture from (1) with:
   (c) one or more alkylene oxides;
   in the presence of:
   (d) one or more double metal cyanide catalysts.

DETAILED DESCRIPTION OF THE INVENTION

As used herein, the phrase "mono- and poly-phenol" refers to and includes mono phenols, diphenols, triphenols and other higher functional phenols as shown in structures I and/or III.

The term "polyoxyalkylene containing polyols" as used herein is understood to be the products of oxyalkylating the condensation products of the phenols or polyphenols of figure I and/or III with the carbonyl containing compounds of figure II and/or IV.

The polyoxyalkylene containing polyols produced by the process of the present invention typically have an equivalent weight of at least about 150, preferably at least about 280 and more preferably at least about 450. These polyoxyalkylene containing polyols also typically have an equivalent weight of less than or equal to about 6000, preferably less than or equal to about 2000 and more preferably less than or equal to about 1600. In addition, these polyoxyalkylene containing polyols may have an equivalent weight ranging between any of these upper and lower values, inclusive, e.g. from about 150 to about 6000, preferably from about 280 to about 2000, and more preferably from about 450 to about 1600. The polyoxyalkylene containing polyols of the present invention also typically have a functionality of at least about 2. The functionality of these polyoxyalkylene containing polyols is typically less than or equal to about 8, preferably less than or equal to about 4 and more preferably less than or equal to about 3. Accordingly, the polyoxyalkylene containing polyols may have a functionality which ranges from about 2 to about 8, preferably from about 2 to about 4, and more preferably from about 2 to about 3.

In accordance with the invention, suitable organic compounds for (a) of the mixture (1) typically have an equivalent weight of at least about 35, preferably at least about 70 and more preferably at least about 90. These organic compounds also typically have an equivalent weight of less than or equal to about 575, preferably less than or equal to about 280 and more preferably less than or equal to about 150. In addition, these organic compounds may have equivalent weights ranging between any combination of these upper and lower values, inclusive, e.g. from 35 to 575, preferably from 70 to 280 and more preferably from 90 to 150. These organic compounds have a functionality of at least about 2, and less than or equal to about 8, preferably less than or equal to about 4 and more preferably less than or equal to about 3. The functionality of these organic compounds may also range between any combination of these upper and lower ranges, inclusive, e.g. from 2 to 8, preferably from 2 to 4, and more preferably from 2 to 3.

These organic compounds (a) comprise the condensation product of (a)(i) a substituted or unsubstituted mono- or polyphenol corresponding to the structure (I), with (a)(ii) a compound which corresponds to the structure (II) as set forth above.

In accordance with the present invention, the substituted or unsubstituted mono- or poly-phenols which correspond to the structure:

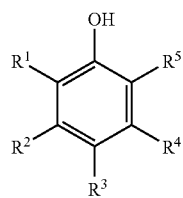

(I)

wherein:
$R^1$, $R^2$, $R^3$, $R^4$ and $R^5$: each independently represent a hydrogen atom, a hydroxyl group, a halogen atom, an alkyl radical having from 1 to 20 carbon atoms and which may be substituted or unsubstituted, a cycloaliphatic radical having from 3 to 7 carbon atoms and which may be substituted or unsubstituted, an aryl radical having 6 carbon atoms and which may be substituted or unsubstituted, an aralkyl radical having from 7 to 20 carbon atoms and which may be substituted or unsubstituted, or any two adjacent R groups may have a combined total of 2 to 4 carbon atoms and form a fused ring with the base structure and may optionally be substituted; with the proviso that at least one of $R^1$, $R^3$ or $R^5$ always represents a hydrogen atom.

Suitable substitutents for alkyl radicals include, for example, halogen atoms, hydroxyl groups, alkoxy groups, carboalkoxy groups, thiols, thioalkyl groups, alkenyl groups, and alkynyl groups. It is preferred that the alkyl radicals are unsubstituted. Suitable substitutents for cycloaliphatic radicals include, for example, halogen atoms, alkyl groups having from 1 to 9 carbon atoms and preferably from 1 to 4 carbon atoms, alkoxy groups, carboalkoxy groups, thiols, thioalkyl groups, alkenyl groups, and alkynyl groups. It is preferred that the cycloaliphatic radicals are unsubstituted. Suitable substitutents for aryl radicals include, for example, halogen atoms, hydroxyl groups, alkoxy groups, carboalkoxy groups, thiols, thioalkyl groups, alkenyl groups, and alkynyl groups. Preferred aryl radicals are unsubstituted. Suitable substitutents for aralkyl radicals in structure (I) above include, for example, halogen atoms hydroxyl groups, alkoxy groups, carboalkoxy groups, thiols, thioalkyl groups, alkenyl groups, and alkynyl groups. It is preferred that the aralkyl radicals are unsubstituted. In the embodiment in which any two adjacent R groups have a combined total of 2 to 4 carbon atoms and form a fused ring with the base structure, the fused ring system may have additional substitution including alkoxy groups, carboalkoxy groups, thiols, thioalkyl groups, alkyl groups, cycloalkyl groups, aryl groups, aralkyl groups, alkenyl groups, alkynyl groups, and preferably hydroxyl groups.

It is more preferred that $R^1$, $R^2$, $R^3$, $R^4$ and $R^5$ each independently represent a hydrogen atom, a hydroxyl group, a halogen atom, an alkyl radical having from 1 to 9 carbon atoms and more preferably from 1 to 4 carbon atoms, a cycloaliphatic radical having from 3 to 9 carbon atoms and more preferably from 5 to 7 carbon atoms, an aryl radical that is unsubstituted or substituted with one or more halogen atoms or one or more hydroxyl groups, or an aralkyl radical having from 7 to 20 carbon atoms, preferably 7 to 10 carbon atoms. Preferred halogen atoms are bromine and chlorine; preferred alkyl radicals are methyl, ethyl, propyl, isopropyl, butyl, isobutyl, etc.

The most preferred phenols to be used as (a)(i) above include those in which each R group in structure (I) represents a hydrogen atom; or those in which $R^1$ and $R^5$ of structure (I) each represent a halogen atom and $R^2$, $R^3$ and $R^4$ of structure (I) each represent a hydrogen atom.

In accordance with the present invention, suitable compounds (a)(ii) to be condensed with (a)(i) the substituted or unsubstituted mono- or poly-phenols described above include those corresponding to the structure:

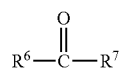

(II)

wherein:
$R^6$ and $R^7$ each independently represent a hydrogen atom, an alkyl radical having from 1 to 20 carbon atoms, a cycloaliphatic radical having from 3 to 7 carbon atoms and which may be substituted or unsubstituted, an aryl radical having 6 carbon atoms and which may be substituted or unsubstituted, an aralkyl radical having from 7 to 20 carbon atoms and which may be substituted or unsubstituted, or $R^6$ and $R^7$ combine to form a ring having from 4 to 8 carbon atoms in the ring, with the ring being substituted or unsubstituted.

Suitable substitutents for alkyl radicals include, for example, halogen atoms, hydroxyl groups, alkoxy groups, carboalkoxy groups, thiols, thioalkyl groups, alkenyl groups, and alkynyl groups. It is preferred that the alkyl radicals are unsubstituted. Suitable substitutents for cycloaliphatic radicals include, for example, halogen atoms, alkyl groups having from 1 to 9 carbon atoms and preferably from 1 to 4 carbon atoms, hydroxyl groups, alkoxy groups, carboalkoxy groups, thiols, thioalkyl groups, alkenyl groups, and alkynyl groups. It is preferred that the cycloaliphatic radicals are either unsubstituted or substituted with alkyl groups Suitable substitutents for aryl radicals include, for example, halogen atoms, hydroxyl groups, alkoxy groups, carboalkoxy groups, thiols, thioalkyl groups, alkenyl groups, and alkynyl groups. Preferred aryl radicals are unsubstituted. Suitable substituents for aralkyl radicals in structure (I) above include, for example, halogen atoms, hydroxyl groups, alkoxy groups, carboalkoxy groups, thiols, thioalkyl groups, alkenyl groups, and alkynyl groups. It is preferred that the aralkyl radicals are unsubstituted.

It is more preferred that $R^6$ and $R^7$ are independently selected from a hydrogen atom, an alkyl radical having from 1 to 9 carbon atoms and more preferably from 1 to 4 carbon atoms.

The most preferred compounds to be used as (a)(ii) above include those in which $R^6$ and $R^7$ in structure (II) are independently hydrogen or methyl, with formaldehyde and acetone being particularly preferred. Another most preferred compound to be used herein corresponds to structure (II) above in which $R^6$ and $R^7$ combine to form the structure IIa:

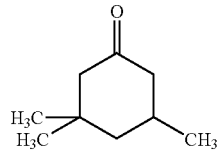

(IIa)

The most preferred compounds to be used as organic compounds (a) herein include, for example, novolak resins, bisphenol A, bisphenol TMC, tetrabromobisphenol A, and the residues of production of bisphenol A, etc.

The condensation products of (a)(i), suitable monophenols and/or polyphenols which correspond to structure (I), with (a)(ii) suitable compounds which correspond to structure (II) are prepared by any of the known processes. Such processes are known and described in the literature, and are disclosed in, for example, U.S. Pat. Nos. 2,468,982, 2,623,908, 3,182,308, 4,052,466, 4,467,122, 4,503,266, 5,698,600 and 5,914,431, the disclosures of which are hereby incorporated by reference. As is described in the art, one typically condenses an excess of monophenol and/or polyphenol with an aldehyde such as, for example formaldehyde, or a ketone such as, for example, acetone, in the presence of a suitable catalyst at a temperature up to about 100° C., preferably 20 to 85° C. and more preferably 40 to 70° C.

In accordance with the present invention, suitable hydroxyl functional compounds having to be used as component (b) of the mixture typically have an equivalent weight of at least about 100, preferably at least about 150, more preferably at least about 280 and most preferably at least about 450. These hydroxyl functional compounds also typically have an equivalent weight of less than or equal to about 6000, preferably less than or equal to about 2000 and more preferably less than or equal to about 1600. In addition, these hydroxyl functional compounds may have equivalent weights ranging between any combination of these upper and lower values, inclusive, e.g. from 100 to 6000, preferably from 150 to 6000, more preferably from 280 to 2000 and most preferably from 450 to 1600. These hydroxyl functional compounds have a functionality of at least about 2, and less than or equal to about 8, preferably less than or equal to about 4 and more preferably less than or equal to about 3. The functionality of these hydroxyl functional compounds may range between any combination of these upper and lower ranges, inclusive, e.g. from 2 to 8, preferably from 2 to 4, and more preferably from 2 to 3.

Suitable hydroxyl functional compounds to be used as component (b) of the mixture (1) above include, for example, polyether polyols, polyester polyols, polycarbonate polyols, polyhydric polythioethers, polyacetals, etc. Such compounds are known and described in the art. Polyether polyols are preferred.

For the cases where component (b) is a polyether polyol, the compound (b) comprises the product of (b)(1) a starter having functionality of 2 to 8 and equivalent weight of 30 to 575 and (2) an alkylene oxide.

Some examples of suitable starters to be used as component (b)(1) in preparing the polyether polyol include compounds such as ethylene glycol, 1,2- and 1,3-propanediol, 1,4- and 2,3-butanediol, 1,6-hexanediol, 1,8-octanediol, neopentyl glycol, 1,3- and 1,4-bis(hydroxymethyl)cyclohexane, 2-methyl-1,3-propanediol, glycerol, trimethylolpropane, 1,2,6-hexanetriol, 1,2,4-butanetriol, trimethylolethane, pentaerythritol, quinitol, mannitol, sorbitol, methyl glycoside, diethylene glycol, triethylene glycol, tetraethylene glycol, polyethylene glycols, dipropylene glycol, polypropylene glycols, dibutylene glycol, and polybutylene glycols.

For the case where component (b) is a polyether polyol, the most preferred starters to be used as (b)(1) comprise one or more organic compounds having an equivalent weight of at least about 35, preferably at least about 70 and more preferably at least about 90. The organic compounds also typically have an equivalent weight of less than or equal to about 575, preferably less than or equal to about 280 and more preferably less than or equal to about 150. In addition, these organic compounds may have equivalent weights ranging between any combination of these upper and lower values, inclusive, e.g. from 35 to 575, preferably from 70 to 280 and more preferably from 90 to 150. These organic compounds have a functionality of at least about 2, and less than or equal to about 8, preferably less than or equal to about 4 and more preferably less than or equal to about 3. The functionality of these organic compounds may also range between any combination of these upper and lower ranges, inclusive, e.g. from 2 to 8, preferably from 2 to 4, and more preferably from 2 to 3.

These organic compounds which are suitable starters (1) for polyether polyols (b) of the mixture comprise the condensation product of (i) a substituted or unsubstituted mono- or poly-phenol which corresponds to the structure:

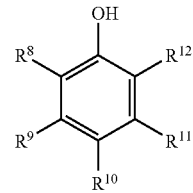

(III)

wherein:
$R^8$, $R^9$, $R^{10}$, $R^{11}$ and $R^{12}$: each independently represent a hydrogen atom, a hydroxyl group, a halogen atom, an alkyl radical having from 1 to 20 carbon atoms, which may be substituted or unsubstituted, a cycloaliphatic radical having from 3 to 7 carbon atoms and which may be substituted or unsubstituted, an aryl radical having 6 carbon atoms and which may be substituted or unsubstituted, an aralkyl radical having from 7 to 20 carbon atoms and which may be substituted or unsubstituted, or any two adjacent R groups may have a combined total of 2 to 4 carbon atoms and form a fused ring with the base structure and may optionally be substituted; with the proviso that at least one of $R^8$, $R^{10}$ or $R^{12}$ always represents a hydrogen atom;

with (ii) a compound corresponding to the structure:

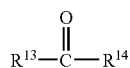
(IV)

wherein:

$R^{13}$ and $R^{14}$: each independently represent a hydrogen atom, an alkyl radical having from 1 to 20 carbon atoms, a cycloaliphatic radical having from 3 to 7 carbon atoms and which may be substituted or unsubstituted, an aryl radical having 6 carbon atoms and which may be substituted or unsubstituted, an aralkyl radical having from 7 to 20 carbon atoms and which may be substituted or unsubstituted, or $R^{13}$ and $R^{14}$ combine to form a ring having from 4 to 8 carbon atoms in the ring, with the ring being substituted or unsubstituted.

Suitable substituents for alkyl radicals, cycloaliphatic radicals, aryl radicals, aralkyl radicals and fused rings of $R^8$, $R^9$, $R^{10}$, $R^{11}$ and $R^{12}$ in structure (III) above include, for example, all of the previously identified substituents for $R^1$, $R^2$, $R^3$, $R^4$ and $R^5$ as set forth for structure (I) above. The preferred embodiments of structure (III) are the same preferred embodiments of structure (I). Thus, the mono- or polyphenol used as (b)(1)(i) which corresponds to structure (III) may be the same or different mono- or poly-phenol as that which corresponds to structure (I) as described above.

Suitable substituents for the alkyl radicals, cycloaliphatic radicals, aryl radicals, aralkyl radicals and fused rings of $R^{13}$ and $R^{14}$ in structure (IV) above include, for example, all of the above identified substituents for $R^6$ and $R^7$ as set forth in structure (II) above. The preferred embodiments of structure (IV) are the same preferred embodiments of structure (II). Thus, the carbonyl compound used as (b)(1)(ii) which corresponds to structure (IV) may be the same or different carbonyl compound as that which corresponds to structure (II) as described above.

Another most preferred compound to be used herein corresponds to structure (IV) above in which that $R^{13}$ and $R^{14}$ combine to form the structure IVa:

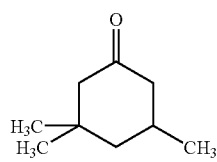
(IVa)

Suitable alkylene oxides to be used as (b)(2) include, for example, ethylene oxide, propylene oxide, butylene oxide, tetrahydrofuran, styrene oxide, and/or epichlorohydrin. Polyether polyols are obtained in the usual manner such as, for example, by polymerizing one or more alkylene oxides (b)(2) such as, for example, ethylene oxide, propylene oxide, butylene oxide, etc., in the presence of a suitable catalyst, such as, for example, $BF_3$, KOH or a double metal cyanide (DMC) catalyst, or by chemically adding these one or more of these alkylene oxides, preferably ethylene oxide and propylene oxide, in admixture or successively, to suitable starter components (b)(1) as described hereinabove. Preferred alkylene oxides are propylene oxide and/or ethylene oxide. In accordance with the present invention, it is preferred that the alkylene oxide used as component (b)(2) to react with the starter (b)(1) in the preparation of the polyether polyol (b) comprise propylene oxide (PO) and ethylene oxide (EO) in a weight ratio of from 50:50 up to 100:0 (PO:EO). It is more preferred that the one or more alkylene oxides (b)(2) which react with the starters (b)(1) to form the polyether polyols (b) comprise propylene oxide and ethylene oxide in a weight ratio of 70:30 to 90:10.

Suitable alkylene oxides to be used as component (c) herein which are reacted with the mixture (1) of components (a) and (b) as described above in the process of producing the polyoxyalkylene containing polyols include, for example, ethylene oxide, propylene oxide, butylene oxide, styrene oxide and epichlorohydrin. It is preferred to use propylene oxide and/or ethylene oxide a weight ratio of from 50:50 up to 100:0 (PO:EO). It is more preferred that the alkylene oxide mixture (2) comprise propylene oxide and ethylene oxide in a weight ratio of 70:30 to 90:10.

In accordance with the present invention, some examples of double metal cyanide compounds that can be used as component (d) in the invention include but are not limited to, for example, zinc hexacyanocobaltate(III), zinc hexacyanoferrate(III), nickel hexacyanoferrate(II), cobalt hexacyanocobaltate(III), and the like. Further examples of suitable double metal cyanide complexes are listed in U.S. Pat. No. 5,158,922, the disclosure of which is herein incorporated by reference. Zinc hexacyanocobaltate(III) is preferred.

Particularly preferred are those solid double metal cyanide (DMC) catalysts which comprise a DMC compound and an organic complexing agent, and are prepared in from about 5 to about 80 wt. %., based on the amount of catalyst, of a polyether having a number average molecular weight greater than about 500. These catalysts exhibit enhanced activity for epoxide polymerizations compared with similar catalysts prepared in the absence of the polyether. Such catalysts are known and described in, for example, U.S. Pat. No. 5,482,908, the disclosure of which is herein incorporated by reference. The double metal cyanide (DMC) compounds which are suitable are the reaction products of a water-soluble metal salt and a water-soluble metal cyanide salt.

The water-soluble metal salt preferably has the general formula $M(X)_n$ in which M is selected from the group consisting of Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II), and Cr(III). More preferably, M is selected from the group consisting of Zn(II), Fe(II), Co(II), and Ni(II). In the formula, X is preferably an anion selected from the group consisting of halide, hydroxide, sulfate, carbonate, cyanide, oxalate, thiocyanate, isocyanate, isothiocyanate, carboxylate, and nitrate. The value of n is from 1 to 3 and satisfies the valency state of M. Examples of suitable metal salts include, but are not limited to, zinc chloride, zinc bromide, zinc acetate, zinc acetonylacetonate, zinc benzoate, zinc nitrate, iron(II) sulfate, iron(II) bromide, cobalt(II) chloride, cobalt(II) thiocyanate, nickel(II) formate, nickel(II) nitrate, and the like, and mixtures thereof.

The water-soluble metal cyanide salts used to make the double metal cyanide compounds preferably have the general formula $(Y)_aM'(CN)_b(A)_c$ in which M' is selected from the group consisting of Fe(II), Fe(III), Co(II), Co(III), Cr(II), Cr(III), Mn(II), Mn(III), Ir(III), Ni(II), Rh(III), Ru(II), V(IV), and V(V). More preferably, M' is selected from the group consisting of Co(II), Co(III), Fe(II), Fe(III), Cr(III), Ir(III), and Ni(II). The water-soluble metal cyanide salt can contain one or more of these metals. In the formula, Y is an alkali metal ion or alkaline earth metal ion, and A is an ion selected from the group consisting of halide, hydroxide, sulfate, carbonate, cyanide, oxalate, thiocyanate, isocyanate, isothiocyanate, carboxylate, and nitrate. Both a and b are integers greater than or equal to 1; the sum of the charges of a, b, and c balances the charge of M'. Suitable water-soluble metal cyanide salts include, but are not limited to, potassium hexacyanocobaltate(III), potassium hexacyanoferrate(II), potassium hexacyanoferrate(III), calcium hexacyanocobaltate(III), lithium hexacyanocobaltate(III), and the like.

The solid DMC catalysts of the invention include an organic complexing agent. Generally, the complexing agent must be relatively soluble in water. Suitable complexing agents are those commonly known in the art, as taught, for example, in U.S. Pat. No. 5,158,922, the disclosure of which is hereby incorporated by reference. The complexing agent is added either during preparation or immediately following precipitation of the catalyst. Usually, an excess amount of the complexing agent is used. Preferred complexing agents are water-soluble heteroatom-containing organic compounds that can complex with the double metal cyanide compound such as, for example, water-soluble aliphatic alcohols selected from the group consisting of ethanol, isopropyl alcohol, n-butyl alcohol, isobutyl alcohol, sec-butyl alcohol, and tert-butyl alcohol. Tert-butyl alcohol is particularly preferred.

The process described herein is commonly referred to as a "heel" process. As is known and understood by one or ordinary skill in the art, a heel process for the production of polyether polyols is a process in which an organic compound is charged into or dispersed into the "heel" of a product or a material that may or may not be similar to the desired end-product. This mixture of organic compound and "heel" is alkoxylated in the presence of a DMC catalyst. One advantage of this process is that it allows for the alkoxylation of solid organic compounds such as, for example, bisphenol A, at temperatures used for conventional polyether polyols. It is not necessary in accordance with the present invention, to first use a higher temperature to melt the solid organic compound. In accordance with the present invention, it is now possible to charge high levels of solid organic compounds, i.e. up to 70% by weight, into the heel with no effect on product quality.

In addition, the preferred phenolic started polyether polyols produced by the process herein have properties (OH number, MW distribution as measured by gel permeation chromatography, and viscosity) that are very similar to analogous products prepared by a commercially less facile "melt process" in which the solid starter is first heated above it's melting point prior to alkoxylation.

The following examples further illustrate details for the compositions of this invention and process of the preparation of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

The DMC catalyst used in the following illustrative examples was prepared using the procedure described in U.S. Pat. No. 5,482,908, Example 3, the disclosure of which is hereby incorporated by reference.

Polyol A: a propoxylated bisphenol A based polyether polyol having an OH# of 56

PO: Propylene oxide

EO: Ethylene oxide

BPA: 2,2-bis(4-hydroxyphenyl)propane (i.e. Bisphenol A)

BP-TMC: 1,1-Bis(4-hydroxyphenyl)-3,3,5-trimethylcyclohexane $Br_4$-BPA: 4,4'-(1-methylethylidene)bis[2,6-dibromophenol] (i.e. tetrabromo Bisphenol A)

Novolak resin 0790 K03: A phenol-formaldehyde resin available from Bakelite AG

Example 1

BPA Alkoxylated to 200 OH Number with PO and EO (8 wt. % EO in Product) Heel Process with 40% Starter in Heel The polyol of Comparative Example 10 (250 g; 0.9 eq.), Bisphenol A (164 g; 1.44 eq.) and a DMC catalyst (0.065 g; 100 ppm) were charged into a stainless steel reactor equipped with a mechanical agitator and slowly heated with stirring. Once the reactor temperature reached 140° C. (~30 minutes), the reactor was evacuated by pulling continuous vacuum on the headspace of the reactor, and allowing a stream of nitrogen to flow through the reaction mixture to maintain a pressure of 0.5 psia for 30 minutes. The nitrogen flow was stopped, and the vacuum valve was closed blocking the vacuum in the reactor (0.5 psia). An initial charge of propylene oxide (42 g) and ethylene oxide (7 g) was pumped into the reactor over 5 minutes. After several minutes, a rapid decrease in the pressure in the reactor was observed, indicating the catalyst had become activated and began to consume the oxide. The remaining charges of propylene oxide (163 g) and ethylene oxide (26 g) were added at a constant feed rate over 38 minutes. After the feed was complete, the reaction mixture was stirred at 140° C. for an additional 30 minutes before vacuum stripping (30 minutes; 130° C.; 0.5 psia with a nitrogen sparge) and discharging the clear colorless liquid from the reactor. BHT (0.32 g; 500 ppm) was dissolved in the hot polyol.

Comparative Example 2

BPA Alkoxylated to 200 OH Number with PO and EO (8 wt. % EO in Product)—Melt Process Bisphenol A (326 g; 2.86 eq.) and a DMC catalyst (0.08 g; 100 ppm) were charged into a stainless steel reactor equipped with a mechanical agitator and slowly heated with stirring to 165° C. to melt the BPA. Once the reactor temperature reached 165° C. (~30 minutes), the reactor was evacuated by pulling continuous vacuum on headspace of the reactor and allowing a stream of nitrogen to flow through the reaction mixture to maintain a pressure of 0.5 psia for 30 minutes. The nitrogen flow was stopped, and the vacuum valve was closed blocking the reactor and an initial charge of propylene oxide (35 g) and ethylene oxide (6 g) was simultaneously pumped into the reactor at a constant rate; over 3 minutes. After several minutes, a rapid decrease in the pressure in the reactor was observed, indicating the catalyst had become activated and began to consume the oxide. The remaining charges of propylene oxide (373 g) and ethylene oxide (60 g) were added at a constant feed rate over 87 minutes. After the feed was complete, the reaction mixture was stirred at 130° C. for an additional 30 minutes before vacuum stripping (30 minutes; 130° C.; 0.5 psia with nitrogen sparge). The product was cooled to 100° C. and discharged from the reactor, as a clear colorless liquid. BHT (0.4 g; 500 ppm) was dissolved in the hot polyol.

Examples 3 through 15 were prepared by a procedure analogous to that of Example 1 (for the heel processes) or Example 2 (for the melt processes). The details of starter, heel, and catalyst charge, along with reaction temperature, initial oxide feed for activation and subsequent oxide feed composition and amount, and feed time, are shown in Tables 1 and 2 (heel process) and Table 3 (melt process).

TABLE 1

Details of the Synthesis of BPA started polyols prepared by the Heel Process of the Invention*

| Example | Description | Starter; (g; eq.) | Heel (g; eq.) | Cat. (ppm) | Reaction Temp. (° C.) | Initial Oxide Feed (g) | Additional Oxide Feed (g) | Feed Time (min.) | BHT (ppm) |
|---|---|---|---|---|---|---|---|---|---|
| Example 1 | BPA to 200 OH# (8% EO) | BPA (164; 1.44) | Example 10 (250; 0.9) | DMC (100) | 140 | PO (42) EO (7) | PO (163) EO (26) | 38 | 500 |
| Example 3 | BPA propoxylated to 112 OH# | BPA (100; 0.88) | Example 7 (200; 0.40) | DMC (100) | 140 | PO (40) | PO (298) | 75 | 100 |
| Example 4 | BPA propoxylated to 112 OH# | BPA (140; 1.23) | Example 7 (140; 0.28) | DMC (100) | 140 | PO (40) | PO (433) | 115 | 100 |
| Example 5 | BPA propoxylated to 112 OH# | BPA (166; 1.45) | Example 7 (71; 0.14) | DMC (100) | 140 | PO (40) | PO (523) | 130 | 100 |
| Example 6 | BPA propoxylated to 112 OH# | BPA (140; 1.23) | Example 4 (140; 0.27) | DMC (100) | 120 | PO (40) | PO (433) | 111 | — |
| Example 8 | BPA to 56 OH# (12.5% EO) | BPA (71; 0.62) | Example 9 (175; 0.18) | DMC (100) | 130 | PO (30) EO (5) | PO (448) EO (70) | 111 | −500 |
| Comparative Example 11 | BPA propoxylated to 112 OH# | BPA (100; 0.88) | Example 7 (200; 0.40) | KOH (3000) | 120 | — | PO (338) | 170 | 100 |

*Except Comparative Example 11, which is prepared by a heel process but using KOH catalyst and thus, is not according to the process of the invention.

TABLE 2

Details of the Synthesis of BP-TMC and Br$_4$-BPA started polyols prepared by the Heel Process of the Invention

| Example | Description | Starter; (g; eq.) | Heel (g; eq.) | Cat. (ppm) | Reaction Temp. (° C.) | Initial Oxide Feed (g) | Additional Oxide Feed (g) | Feed Time (min.) | BHT (ppm) |
|---|---|---|---|---|---|---|---|---|---|
| Example 12 | BP-TMC propoxylated to 56 OH# | BP-TMC (500; 3.23.) | Polyol A (600; 0.61.) | DMC (250) | 130 | PO (90) | PO (2636) | 155 | — |
| Example 14 | BPA:Br$_4$-BPA (2:1 pbw) propoxylated to 77 OH# | Br$_4$-BPA (33; 0.12) and BPA (67; 0.59) | Example 13 (200; 0.40) | DMC (200) | 130 | PO (25) | PO (475) | 118 | 100 |
| Example 15 | Br$_4$-BPA propoxylated to 45 OH# | Br$_4$-BPA (100; 0.37) | Example 14 (200; 0.28) | DMC (200) | 130 | PO (25) | PO (475) | 118 | 100 |

TABLE 3

Details of the Synthesis of Comparative Examples Prepared by a Melt Process

| Example | Description | Starter (g; eq.) | Catalyst (ppm) | Reaction temp. (° C.) | Initial Oxide feed (g) | Additional Oxide Feed (g) | Feed time (minutes) | BHT (ppm) |
|---|---|---|---|---|---|---|---|---|
| Comparative Example 2 | BPA to 200 OH# (8% EO) | BPA (326; 2.86) | DMC (100) | 165 | PO (35) EO (6) | PO (373) EO (60) | 87 | 500 |
| Comparative Example 7 | BPA propoxylated to 112 OH# | BPA (4000; 35.0) | DMC (50) | 165 | PO (500) | PO (13,035) | 180 | 100 |
| Comparative Example 9 | BPA to 56 OH# (12.5% EO) | Example 10 (224; 0.80) | DMC (100) | 130 | PO (26) EO (4) | PO (1469) EO (77) | 110 | 500 |

TABLE 3-continued

Details of the Synthesis of Comparative Examples Prepared by a Melt Process

| Example | Description | Starter (g; eq.) | Catalyst (ppm) | Reaction temp. (° C.) | Initial Oxide feed (g) | Additional Oxide Feed (g) | Feed time (minutes) | BHT (ppm) |
|---|---|---|---|---|---|---|---|---|
| Comparative Example 10 | BPA to 200 OH# (8% EO) | BPA (326; 2.86) | DMC (100) | 165 | PO (35) EO (6) | PO (373) EO (60) | 87 | 500 |
| Comparative Example 13 | BPA:Br$_4$-BPA (2:1 pbw) propoxylated to 112 OH# | Br$_4$-BPA (67, 0.25) and BPA (133; 1.16) | DMC (200) | 165 | PO (25) | PO (480) | 120 | 100 |

Comparative Example 16

Novolak 0790 K03 Propoxylated to 65 OH Number (in Toluene)

Novolak resin 0790 K03 obtained from Bakelite AG (100 g) and the DMC catalyst (0.45 g; 500 ppm) were charged into a stainless steel reactor equipped with a mechanical agitator and slowly heated with stirring. Once the reactor temperature reached 130° C. (~30 minutes), the reactor was evacuated by pulling continuous vacuum on the headspace of the reactor and allowing a stream of nitrogen to flow through the reaction mixture to maintain a pressure of 0.5 psia for 30 minutes. The nitrogen flow was stopped, and the vacuum valve was closed blocking the vacuum in the reactor (0.5 psia). Toluene (100 g) was then pumped into the reactor over 60 minutes. An initial charge of propylene oxide (20 g) was pumped into the reactor over 10 minutes. After 30 minutes, the reactor pressure decreased and a second charge of propylene oxide (20 g) was pumped into the reactor over 10 minutes. After 15 minutes, the reactor pressure decreased and a third charge of propylene oxide (20 g) was pumped into the reactor over 10 minutes. After 10 minutes, the reactor pressure decreased and a fourth charge of propylene oxide (20 g) was pumped the reactor. After several minutes, a rapid decrease in the pressure in the reactor was observed, indicating that the catalyst had become activated and began to consume the oxide. The remaining charge of propylene oxide (740 g) was added over approximately 240 minutes. After the feed was complete, the reaction mixture was stirred at 130° C. for an additional 60 minutes before vacuum stripping (130° C., 0.5 psia) to remove the toluene and discharging the product from the reactor. Irganox 1076 (0.42 g, 500 ppm) was added to the hot polyol. Analytical data for the polyol are shown in Table 6.

Example 17

Novolak 0790 K03 Propoxylated to 75 OH Number (in heel of Comparative Example 16

The polyol from Comparative Example 16 (100 g), Novolak resin 0790 K03 obtained from Bakelite AG (100 g) and a DMC catalyst (0.55 g; 550 ppm) were charged into a stainless steel reactor equipped with a mechanical agitator and slowly heated with stirring. Once the reactor temperature reached 130° C. (~30 minutes), the reactor was evacuated by pulling continuous vacuum on the headspace of the reactor and allowing a stream of nitrogen to flow through the reaction mixture to maintain a pressure of 0.5 psia for 30 minutes. The nitrogen flow was stopped, and the vacuum valve was closed blocking the vacuum in the reactor (0.5 psia). An initial charge of propylene oxide (20 g) was pumped into the reactor over 3 minutes. The pressure decreased rapidly indicating the catalyst had become activated and began to consume the oxide. The remaining charge of propylene oxide (540 g) was added at a constant feed rate over 180 minutes. After the feed was complete, the reaction mixture was stirred at 130° C. for an additional 90 minutes before vacuum stripping (30 minutes; 130° C.) and discharging the liquid from the reactor. Irganox 1076 (0.37 g; 500 ppm) was added to the hot polyol. Analytical data for the polyol are shown in Table 6.

Example 18

Novolak 0790 K03 Propoxylated to 60 OH Number (in Heel of Example 17

The polyol from Example 17 (102.5 g), Novolak resin 0790 K03 obtained from Bakelite AG (102.5 g) and a DMC catalyst (0.43 g; 420 ppm) were charged into a stainless steel reactor equipped with a mechanical agitator and slowly heated with stirring. Once the reactor temperature reached 130° C. (~30 minutes), the reactor was evacuated by pulling continuous vacuum on the headspace of the reactor and allowing a stream of nitrogen to flow through the reaction mixture to maintain a pressure of 0.5 psia for 30 minutes. The nitrogen flow was stopped, and the vacuum valve was closed blocking the vacuum in the reactor (0.5 psia). An initial charge of propylene oxide (20 g) was pumped into the reactor over 10 minutes. After several minutes, a rapid decrease in the pressure in the reactor was observed, indicating the catalyst had become activated and began to consume the oxide. The remaining charge of propylene oxide (800 g) was added at a constant feed rate over 260 minutes. After the feed was complete, the reaction mixture was stirred at 130° C. for an additional 90 minutes before vacuum stripping (30 minutes; 130° C.) and discharging the liquid from the reactor. Irganox 1076 (0.5 g; 500 ppm) was added to the hot polyol. Analytical data for the polyol are shown in Table 6.

Example 19

Novolak 0790 K03 Propoxylated to 55 OH Number (in Heel of Example 18

The polyol from Example 18 (100 g), Novolak resin 0790 K03 obtained from Bakelite AG (100 g) and a DMC catalyst (0.45 g; 450 ppm) were charged into a stainless steel reactor equipped with a mechanical agitator and slowly heated with stirring. Once the reactor temperature reached 130° C. (~30 minutes), the reactor was evacuated by pulling continuous vacuum on the headspace of the reactor and allowing a stream of nitrogen to flow through the reaction mixture to maintain a pressure of 0.5 psia for 30 minutes. The nitrogen flow was stopped, and the vacuum valve was closed blocking the vacuum in the reactor (0.5 psia). An initial charge of propylene oxide (20 g) was pumped into the reactor over 10 minutes. After several minutes, a rapid decrease in the pressure in the reactor was observed, indicating the catalyst had become activated and began to consume the oxide. The remaining charge of propylene oxide (800 g) was added at a constant feed rate over 250 minutes. After the feed was complete, the reaction mixture was stirred at 130° C. for an additional 30 minutes before vacuum stripping (30 minutes; 130° C.) and discharging the liquid from the reactor. Irganox 1076 (0.5 g; 500 ppm) was added to the hot polyol. Analytical data for the polyol are shown in Table 6.

Tables 4 shows a summary of the description and analytical properties of Bisphenol A started polyols prepared according to the invention, along with comparative examples prepared by a melt process that is not according to the invention.

Table 5 provides similar data for polyols prepared using Bisphenol TMC and either Tetrabromo BPA or a combination of Tetrabromo BPA and BPA as the starter.

Table 6 provides a description and analytical properties for polyols prepared using phenol-formaldehyde resins as starters.

TABLE 4

BPA started polyols - prepared by the heel process of our invention and comparative examples prepared either by a melt process or a heel process using KOH catalyst

| Example | Product Description | Heel or melt | Wt % Starter in Heel | Rxn Temp ° C. | Catalyst (ppm) | OH# (Exp) | Visc (cks) | Mn | Peak MW | PDI** |
|---|---|---|---|---|---|---|---|---|---|---|
| Example 1 | BPA to 200 OH# (8% EO) (product to product) | Heel | 40 | 140 | DMC (100) | 200.5 | 4362 | 571 | 585 | 1.03 |
| Comparative Example 2 | BPA to 200 OH# (8% EO) | Melt | — | 160 | DMC (100) | 199.0 | 4334 | 578 | 588 | 1.03 |
| Example 3 | BPA propoxylated to 112 OH# (product to product) | Heel | 33 | 140 | DMC (100) | 114.0 | 1317 | 852 | 812 | 1.03 |
| Example 4 | BPA propoxylated to 112 OH# (product to product) | Heel | 50 | 140 | DMC (100) | 109 | 1257 | 884 | 861 | 1.03 |
| Example 5 | BPA propoxylated to 112 OH# (product to product) | Heel | 70 | 140 | DMC (100) | 109 | 1229 | 889 | 874 | 1.02 |
| Example 6 | BPA propoxylated to 112 OH# (product to product) | Heel | 50 | 120 | DMC (100) | 109.0 | 1259 | 856 | 887 | 1.04 |
| Comparative Example 7 | BPA propoxylated to 112 OH# | Melt | — | 165 | DMC (50) | 115.0 | 1243 | 847 | 829 | 1.03 |
| Example 8 | BPA to 56 OH# (12.5% EO) (product to product) | Heel | 29 | 130 | DMC (100) | 55.5 | 824 | 1821 | 1756 | 1.05 |
| Comparative Example 9 | BPA to 56 OH# (12.5% EO) | Melt | — | 130 | DMC (100) | 56.4 | 830 | 1721 | 1694 | 1.04 |
| Comparative Example 10 | BPA to 200 OH# (8% EO) | Melt | — | 160 | DMC (100) | 200 | 4911 | 563 | 560 | 1.02 |
| Comparative Example 11 | BPA propoxylated to 112 OH# (product to product) | Heel | 33 | 120 | KOH (3000) | 115 | 2125 | 816 | 706* and 1182 | 1.14 |

*Bimodal MW distribution;
**PDI is the polydispersity index defined as the ratio of weight average MW to number average MW

TABLE 5

Bisphenol TMC and Tetrabromobisphenol A started polyether polyols made via the single stage heel process of our invention and a comparative example

| Example | Product Description | Heel or melt | Wt % Starter in Heel | Rxn Temp ° C. | Catalyst (ppm) | OH# (Exp) | Visc (cks) | Mn | Peak MW | PDI |
|---|---|---|---|---|---|---|---|---|---|---|
| Example 12 | BP-TMC propoxylated to 56 OH# | Heel | 45 | 130 | DMC (250) | 56.2 | 1638 | 1524 | 1435 | 1.07 |
| Comparative Example 13 | BPA:Br$_4$-BPA (2:1 pbw) propoxylated to 112 OH# | Melt | — | 165 | DMC (200) | 112 | 1664 | 842 | 850 | 1.05 |
| Example 14 | BPA:Br$_4$-BPA (2:1 pbw) propoxylated to 77 OH# | Heel | 33 | 130 | DMC (200) | 75.8 | 1112 | 1227 | 1226 | 1.05 |
| Example 15 | Br$_4$-BPA propoxylated to 45 OH# | Heel | 33 | 130 | DMC (200) | 43.6 | 1392 | 1879 | 1846 | 1.07 |

TABLE 6

Polyether polyols prepared by alkoxylation of phenol-formaldehyde resins prepared by the heel process of the invention

| Example | Product Description | Heel or melt | Wt % Starter in Heel | Rxn Temp ° C. | Catalyst (ppm) | OH# (Exp) | Visc (cks) | Mn | Peak MW | PDI |
|---|---|---|---|---|---|---|---|---|---|---|
| Comparative Example 16 | Novolak 0790 K03 propoxylated to 65 OH# (in toluene) | Toluene | — | 130 | 450 | 64.5 | 4341 | 5232 | 4611 | 1.98 |
| Example 17 | Novolak 0790 K03 propoxylated to 70 OH# | Heel | 50 | 130 | 550 | 77 | 4893 | 4139 | 4932 | 2.02 |
| Example 18 | Novolak 0790 K03 propoxylated to 60 OH# | Heel | 50 | 130 | 420 | 62.4 | 4041 | 5118 | 4968 | 1.99 |
| Example 19 | Novolak 0790 K03 propoxylated to 55 OH# | Heel | 50 | 130 | 450 | 55.4 | 3786 | 5845 | 5451 | 2.04 |

Examples 1, 3-6, and 8 were prepared according to the invention and illustrate that bisphenol A started polyether polyols can be prepared by a DMC catalyzed single stage heel process with MW distribution and viscosity similar to those obtained from a higher temperature process using molten BPA. Reaction temperature and the weight % of BPA starter in the heel are varied from 120° C. to 140° C. and 33-70 wt. %, respectively, without detriment to the product. Comparative Examples 2, 7, 9, and 10 indicate that charging all of the starter without any heel and heating to above the m.p. of the starter (i.e. a melt process) gives products with similar properties to the products prepared according to the invention. Comparative Example 11 illustrates that using a conventional KOH catalyst with the heel process, in place of the DMC catalyst, results in a product with diminished properties (i.e. broad, bimodal MW distribution and higher viscosity) than products prepared according to the heel process of our invention with the DMC catalyst.

Examples 12 illustrates the preparation of a Bisphenol TMC started polyether polyol using the process of the invention. Examples 14 and 15 illustrate the preparation of polyether polyols started either on a mixture of tetrabromobisphenol A and Bisphenol A, (Ex. 14) or started on tetrabromobisphenol A (Ex. 15) using the process of our invention. Comparative Example 13 illustrates preparation of a polyether polyol started on a mixture of tetrabromobisphenol A and Bisphenol A using a higher temperature melt process, and is not according to the process of the invention.

Examples 17-19 illustrate the use of the heel process of our invention to prepare polyether polyols using phenol-formaldehyde resins as starters. Comparative example 16 illustrates that a solvent based process (not according to the invention) gives a material with similar properties, but requires the addition and removal of a volatile solvent.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A one-stage process for the production of a polyoxyalkylene containing polyol having an equivalent weight of about 150 to about 6000, and a functionality of about 2 to about 8, comprising (1) mixing
  (a) from about 1 to about 70% by weight of an organic compound having a hydroxyl functionality of 2 to 8, an equivalent weight of about 35 to about 575, and which comprises the condensation product of:
    (i) a substituted or unsubstituted mono- or poly-phenol which corresponds to the structure:

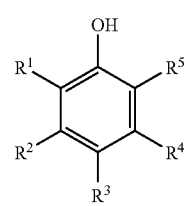

(I)

wherein:
$R^1$, $R^2$, $R^3$,
$R^4$ and $R^5$: each independently represent a hydrogen atom, a hydroxyl group, a halogen atom, an alkyl radical having from 1 to 20 carbon atoms, and which may be substituted or unsubstituted, a cycloaliphatic radical having from 3 to 7 carbon atoms and which may be substituted or unsubstituted, an aryl radical having 6 carbon atoms and which may be substituted or unsubstituted, an aralkyl radical having from 7 to 20 carbon atoms and which may be substituted or unsubstituted, or any two adjacent R groups have a combined total of 2 to 4 carbon atoms and form a fused ring with the base structure and which is optionally be substituted; with the proviso that at least one of $R^1$, $R^3$ or $R^5$ always represents a hydrogen atom;

with
(ii) a compound corresponding to the structure:

(II)

wherein:

$R^6$ and $R^7$: each independently represents a hydrogen atom, an alkyl radical having from 1 to 20 carbon atoms and which is substituted or unsubstituted, a cycloaliphatic radical having from 3 to 7 carbon atoms and which is substituted or unsubstituted, an aryl radical having 6 carbon atoms and which is substituted or unsubstituted, an aralkyl radical having from 7 to 20 carbon atoms and which is substituted or unsubstituted, or $R^6$ and $R^7$ form a ring having from 5 to 7 carbon atoms in the ring, with the ring being substituted or unsubstituted;

and (b) from about 30% to about 99% by weight of a hydroxyl functional component which comprises a polyether polyol having an equivalent weight of about 150 to about 6000 and a functionality of about 2 to about 8, and comprises the reaction product of:

(1) a starter having a functionality of about 2 to about 8 and an equivalent weight of about 35 to about 575, which comprises the condensation product of:

(i) a substituted or unsubstituted mono- or polyphenol which corresponds to the structure:

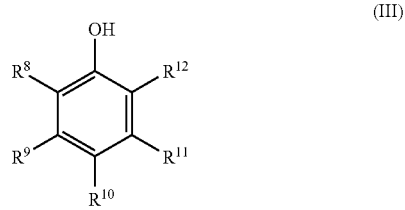

(III)

wherein:

$R^8$, $R^9$, $R^{10}$, $R^{11}$ and $R^{12}$: each independently represent a hydrogen atom, a hydroxyl group, a halogen atom, an alkyl radical having from 1 to 20 carbon atoms and which is substituted or unsubstituted, a cycloaliphatic radical having from 3 to 7 carbon atoms and which is substituted or unsubstituted, an aryl radical having 6 carbon atoms and which is substituted or unsubstituted, or an aralkyl radical having from 7 to 20 carbon atoms and which is substituted or unsubstituted, or any two adjacent R groups may have a combined total of 2 to 4 carbon atoms and form a fused ring with the base structure and which may be optionally substituted; with the proviso that at least one of $R^1$, $R^3$ or $R^5$ always represents a hydrogen atom;

with (ii) a compound corresponding to the structure:

(IV)

wherein:

$R^{13}$ and $R^{14}$: each independenfly represent a hydrogen atom, an alkyl radical having from 1 to 20 carbon atoms and which is substituted or unsubstituted, a cycloaliphatic radical having from 3 to 7 carbon atoms and which is substituted or unsubstituted, an aryl radical having 6 carbon atoms and which is substituted or unsubstituted, an aralkyl radical having from 7 to 20 carbon atoms and which is substituted or unsubstituted, or $R^6$ and $R^7$ form a ring having from 5 to 7 carbon atoms in the ring, with the ring being substituted or unsubstituted, with (2) one or more alkylene oxides, wherein the sum of the %'s by weight of (a) and (b) totals 100% by weight of the mixture formed in (1);

and (2) alkoxylating the mixture from (1) with:

(c) one or more alkylene oxides;

in the presence of:

(d) one or more double metal cyanide catalysts.

2. The process of claim 1, wherein (a) said organic compound is a compound selected from the group consisting of 2,2-bis(4-hydroxyphenyl)propane, 1,1-bis(4-hydroxyphenyl)-3,3,5-trimethylcyclohexane, 4,4'-(1-methylethylidene)bis[2,6-dibromophenol] and a novolak resin.

3. The process of claim 1, wherein (b)(1) said starter comprises an organic compound that is selected from the group consisting of 2,2-bis(4-hydroxyphenyl)propane, 1,1-bis(4-hydroxyphenyl)-3,3,5-trimethylcyclohexane, 4,4'-(1-methylethylidene)bis[2,6-dibromophenol] and a novolak resin.

4. The process of claim 1 in which from 10 to 70% by weight of (a) said organic compound is present, and from 30 to 90% by weight of (b) said hydroxyl functional compound is present, with the sum of the %'s by weight of (a) and (b) totaling 100% by weight of the mixture formed in (1).

5. The process of claim 1, in which the resultant polyoxyalkylene containing polyol has an equivalent weight of about 280 to about 2000 and a hydroxyl functionality of about 2 to about 4.

6. The process of claim 1, wherein (a) said organic compound has an equivalent weight of about 70 to about 280 and a functionality of about 2 to about 4.

7. The process of claim 1, wherein (b) said hydroxyl functional component has an equivalent weight of about 150 to about 6000 and a functionality of about 2 to about 4.

8. The process of claim 1, in which in structure (I) either $R^1$, $R^2$, $R^3$, $R^4$ and $R^5$ each represent a hydrogen atom, or $R^1$ and $R^5$ each represent a halogen atom and $R^2$, $R^3$ and $R^4$ each represent a hydrogen atom; and in structure (II) $R^6$ and $R^7$ each independently represent either a hydrogen atom or a methyl group.

9. The process of claim 1, in which in structure (III) either $R^8$, $R^9$, $R^{10}$, $R^{11}$ and $R^{12}$ each represent a hydrogen atom, or $R^8$ and $R^{12}$ each represent a halogen atom and $R^9$, $R^{10}$ and $R^{11}$ each represent a hydrogen atom; and in structure (IV) $R^{13}$ and $R^{14}$ each independently represent either a hydrogen atom or a methyl group.

10. The process of claim 1, wherein (c) said one or more alkylene oxides are selected from the group consisting of ethylene oxide, propylene oxide and mixtures thereof.

11. The process of claim 1, wherein (b)(2) said one or more alkylene oxides are selected from the group consisting of ethylene oxide, propylene oxide and mixtures thereof.

12. A one-stage process for the production of 2,2-bis(4-hydroxyphenyl)propane started polyether polyols having an equivalent weight of about 150 to about 6000, comprising mixing
- (a) from about 1% to about 70% by weight of 2,2-bis(4-hydroxyphenyl)propane, with
- (b) from about 30% to about 99% by weight of a 2,2-bis(4-hydroxyphenyl)propane started polyether polyol having an equivalent weight of about 150 to 6000;

(2) alkoxylating the mixture from (1) with
- (c) one or more alkylene oxides, in the presence of
- (d) one or more double metal cyanide catalysts.

* * * * *